United States Patent
Kluemper et al.

(10) Patent No.: US 8,489,295 B2
(45) Date of Patent: Jul. 16, 2013

(54) UP-SHIFT CONTROL IN AN AUTOMATIC TRANSMISSION WITH NEGATIVE INPUT TORQUE

(75) Inventors: Kevin L. Kluemper, Monrovia, IN (US); Brett R. Caldwell, New Palestine, IN (US); Jeffrey K. Runde, Fishers, IN (US); Robert M. Merrion, Pittsboro, IN (US)

(73) Assignee: GM Global Technology Operations LLC

( * ) Notice: Subject to any disclaimer, the term of this patent is extended or adjusted under 35 U.S.C. 154(b) by 1246 days.

(21) Appl. No.: 12/335,900

(22) Filed: Dec. 16, 2008
(Under 37 CFR 1.47)

(65) Prior Publication Data
US 2009/0319143 A1 Dec. 24, 2009

Related U.S. Application Data

(60) Provisional application No. 61/074,911, filed on Jun. 23, 2008.

(51) Int. Cl.
G06F 7/00 (2006.01)
G06F 17/00 (2006.01)
G06F 19/00 (2011.01)

(52) U.S. Cl.
USPC .......................................... 701/60

(58) Field of Classification Search
USPC .......................................... 701/60
See application file for complete search history.

(56) References Cited

U.S. PATENT DOCUMENTS

| | | | | |
|---|---|---|---|---|
| 5,074,166 A * | 12/1991 | Yamashita et al. | | 477/39 |
| 5,679,099 A * | 10/1997 | Kato et al. | | 477/176 |
| 6,080,084 A * | 6/2000 | Yasue et al. | | 477/154 |
| 6,468,183 B1 * | 10/2002 | O'Neil et al. | | 477/107 |
| 6,832,978 B2 * | 12/2004 | Buchanan et al. | | 477/174 |
| 8,214,116 B2 * | 7/2012 | Whitton | | 701/55 |
| 2002/0010052 A1 * | 1/2002 | Suzuki | | 477/121 |
| 2004/0172184 A1 * | 9/2004 | Vukovich et al. | | 701/51 |
| 2005/0072255 A1 * | 4/2005 | McCrary et al. | | 74/330 |
| 2007/0010927 A1 * | 1/2007 | Rowley et al. | | 701/51 |
| 2007/0055430 A1 * | 3/2007 | Sakamoto | | 701/51 |
| 2008/0176708 A1 * | 7/2008 | Tamai et al. | | 477/125 |
| 2008/0293539 A1 * | 11/2008 | Matsubara et al. | | 477/37 |

* cited by examiner

*Primary Examiner* — Khoi Tran
*Assistant Examiner* — Harry Oh

(57) ABSTRACT

A transmission control module including a shift control module that generates an enable signal when an up-shift is requested and the engine torque is below a threshold torque value. A turbine speed profile determination module that selectively generates a desired turbine speed profile. The shift control module controls a clutch pressure of an off-going clutch based on a measured turbine speed and the desired turbine speed profile when the enable signal is generated.

20 Claims, 7 Drawing Sheets

UP-SHIFT CONTROL IN AN AUTOMATIC TRANSMISSION WITH NEGATIVE INPUT TORQUE

CROSS-REFERENCE TO RELATED APPLICATIONS

This application claims the benefit of U.S. Provisional Application No. 61/074,911, filed on Jun. 23, 2008. The disclosure of the above application is incorporated herein by reference.

FIELD

The present invention relates to transmission control systems and methods, and more particularly to up-shift control in an automatic transmission control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a vehicle powertrain 100 is presented. The vehicle powertrain 100 includes an engine 104 and a transmission 108. Air is drawn through a throttle valve 112 into an intake manifold 114. An air-fuel mixture is created by injecting fuel from fuel injector 116 into the intake manifold 114. The air-fuel mixture is drawn through an open intake valve 118 into a representative cylinder 120. Alternatively, the fuel injector 116 may inject fuel directly into the cylinder 120.

An ignition coil 122 activates a spark plug 124 to ignite the air-fuel mixture within the cylinder 120. After ignition, an exhaust valve 126 allows the cylinder 120 to vent the products of combustion to an exhaust system 128. An engine control module (ECM) 130 receives signals from sensors, such as an engine coolant temperature (ECT) sensor 132. The ECM 130 then controls various actuators of the engine 104, such as the fuel injector 116 and the ignition coil 122.

Torque from the engine 104 is output to the transmission 108 via a transmission input shaft 136. The transmission 108 outputs the torque to a driveline (not shown) via a transmission output shaft 138. The ratio between the speed of the transmission input shaft 136 and the speed of the output shaft 138 is controlled by a planetary gear set 140.

In various implementations, the planetary gear set 140 may be a complex planetary gear set, such as one including one ring gear, two sun gears, and two sets of planet gears. Alternatively, the planetary gear set 140 may include two or more complete sets of planetary gears, various components of which may be connected to each other and to the input and output of the planetary gear set 140.

The ratio between the input and output shafts 136 and 138 is determined by which of the components of the planetary gear set 140 are held stationary and/or connected to each other. Components of the planetary gear set 140 are controlled by a plurality of friction devices, including a first friction device 142 and a second friction device 144.

The first and second devices 142 and 144 are controlled by first and second actuators 146 and 148, respectively. The first and second actuators 146 and 148 are controlled by a transmission control module 160. The transmission control module 160 receives signals from various sensors, including a transmission fluid temperature sensor 162 and a transmission ratio sensor 164. The transmission ratio sensor 164 may determine the ratio by dividing the speed of the transmission input shaft 136 by the speed of the transmission output shaft 138. The transmission ratio sensor 164 may be located in the transmission 108 and may determine the speeds of the transmission input and output shafts 136 and 138 based on engine speed and wheel speed, respectively.

The transmission control module 160 receives data from the ECM 130. The transmission control module 160 may receive signals from a transfer case control module 166, such as may be implemented in a four-wheel-drive or all-wheel-drive vehicle. The transmission control module 160 receives signals from a shift selector 168, which is operated by a driver of the vehicle. For example only, the shift selector 168 may be a column-mounted or floor-mounted shift lever. The transmission control module 160 receives calibration parameters from a nonvolatile memory 170 and may store information in the nonvolatile memory 170.

SUMMARY

The present disclosure provides a control system comprising a transmission control module including a shift control module that generates an enable signal when an up-shift is requested and the engine torque is below a threshold torque value. A turbine speed profile determination module that selectively generates a desired turbine speed profile. The shift control module controls a clutch pressure of an off-going clutch based on a measured turbine speed and the desired turbine speed profile when the enable signal is generated.

In addition, the present disclosure provides a method comprising generating an enable signal when an up-shift is requested and engine torque is below a threshold torque value and selectively generating a desired turbine speed profile, wherein the shift control module controls a clutch pressure of an off-going clutch based on a measured turbine speed and the desired turbine speed profile when the enable signal is generated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
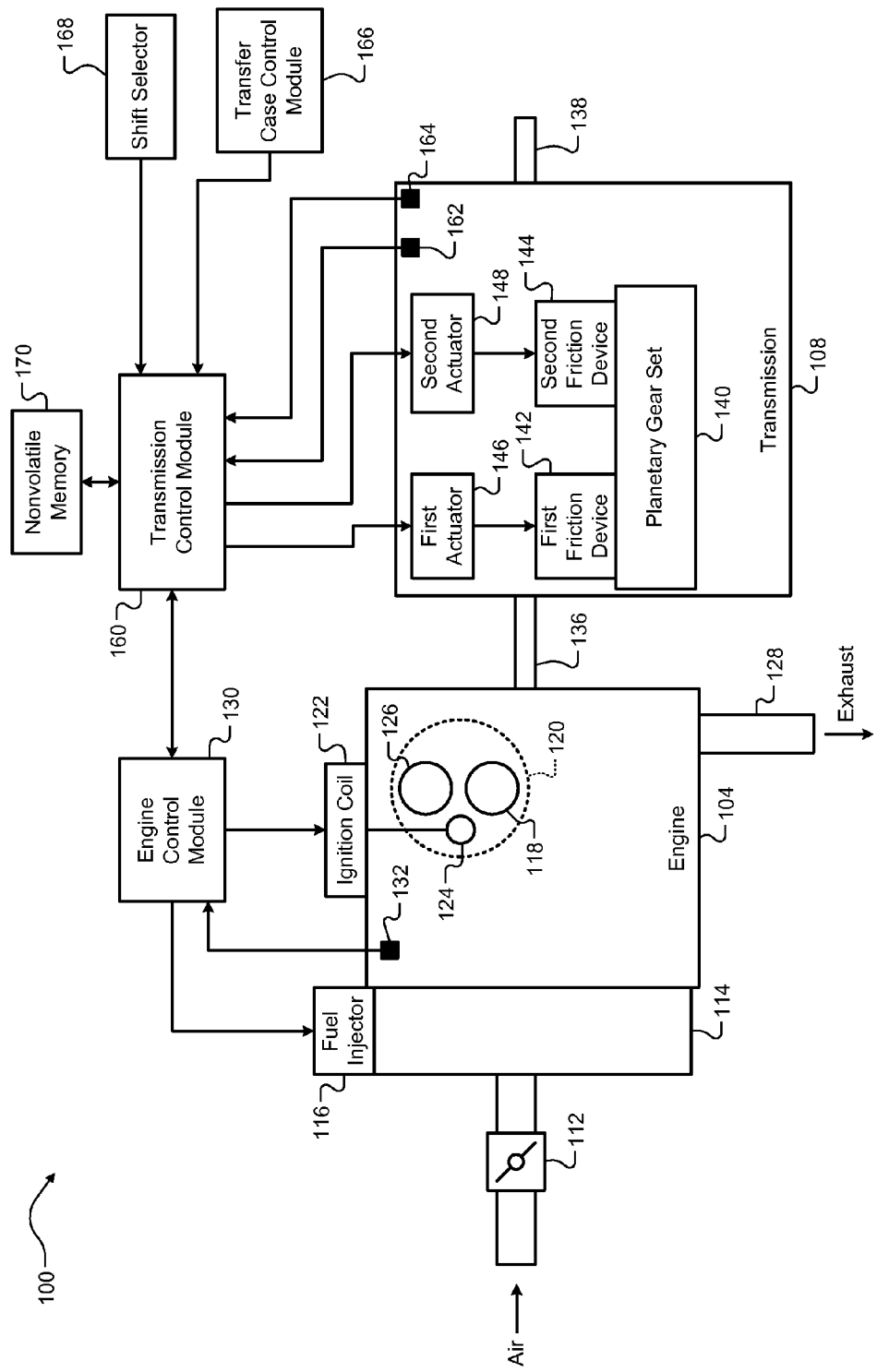
FIG. 1 is a functional block diagram of a vehicle powertrain according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

During an up-shift, a transmission shifts from a first gear to a second higher gear. The first gear is released by an off-going clutch and the second higher gear is engaged by an oncoming clutch. When the transmission shifts, the wheel speed should remain approximately the same. Because the second gear is higher, turbine speed (input to the transmission) needs to decrease to maintain the same wheel speed after the shift. Normally, the engine torque is greater than zero. The oncoming clutch therefore works against the engine to pull the turbine speed down to match the new gear. However, when the engine torque is less than or equal to zero, the engine is already pulling the turbine speed down. Therefore, the turbine speed may decrease more quickly than desired. Partial pressure may be maintained on an off-going clutch in order to slow the decrease in turbine speed. The amount of pressure may be controlled to achieve a desired turbine speed profile, such as a linear decrease in turbine speed.

Figure 2:
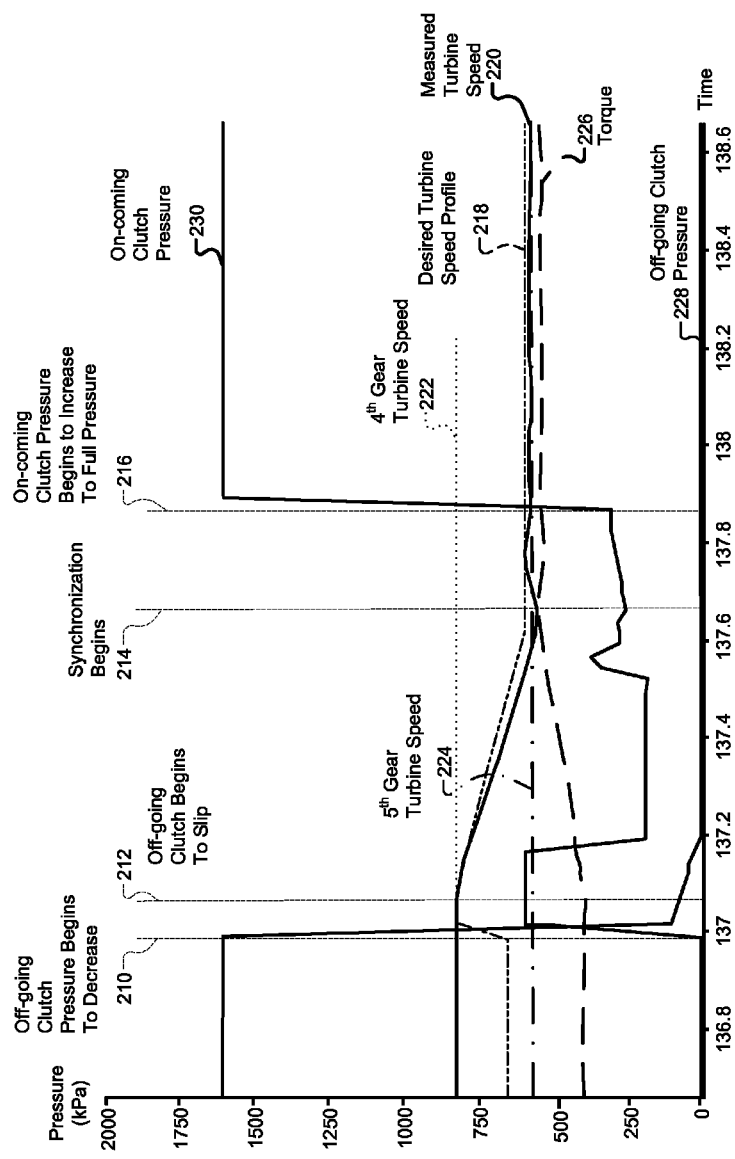
FIG. 2 is a chart depicting graphs of exemplary transmission signals during an up-shift of a transmission using an oncoming clutch control.

With reference to FIG. 2, a chart is shown depicting an exemplary turbine speed profile during an up-shift of a transmission when engine torque is negative. The off-going clutch control is not used to slow the decrease in turbine speed, which may allow the turbine speed to decrease faster than desired. The measured turbine speed, represented by exemplary trace 220, decreases faster than a desired turbine speed profile, represented by exemplary trace 218.

When the measured turbine speed 220 decreases faster than the desired turbine speed profile 218, near time 214, the measured turbine speed 220 will fall below the speed at which synchronization with a next gear will occur. Because the measured turbine speed 220 does not match the synchronization speed, the measured turbine speed 220 will need to be increased to match the synchronization speed in order to engage the second gear. The driver may perceive the up-shift as harsh or unpleasant when this happens.

Exemplary trace 226 represents a negative engine torque. The engine torque may be negative when the driver is applying less pressure to the accelerator pedal than necessary to maintain the desired vehicle speed. If an up-shift is requested when engine torque is negative, the off-going clutch may be used to prevent the measured turbine speed 220 from falling faster than desired. Exemplary trace 222 represents a fourth gear turbine speed. Exemplary trace 224 represents a fifth gear turbine speed. The fourth and fifth gear turbine speeds 222 and 224 are shown as part of a 4-5 shift, for example only. Other shifts can be controlled similarly using nonadjacent gears to control the measured turbine speed 220 during an up-shift when engine torque is negative.

At time 210, control initiates an exemplary up-shift from the fourth gear ratio to the fifth gear ratio. To complete the up-shift, a pressure of an off-going clutch, represented by exemplary trace 228, begins to decrease and a pressure of an oncoming clutch, represented by exemplary trace 230, begins to increase. At time 212, the off-going clutch begins to slip as the pressure of the off-going clutch 228 decreases. As the pressure of the off-going clutch pressure 228 decreases to zero, the fourth gear disengages. Near time 214, the pressure of the oncoming clutch 230 is commanded to a pressure that will fill the oncoming clutch. At time 216, the pressure of the oncoming clutch 230 is commanded to full pressure. Increasing the pressure of the oncoming clutch 230 fully engages the fifth gear.

Figure 3:
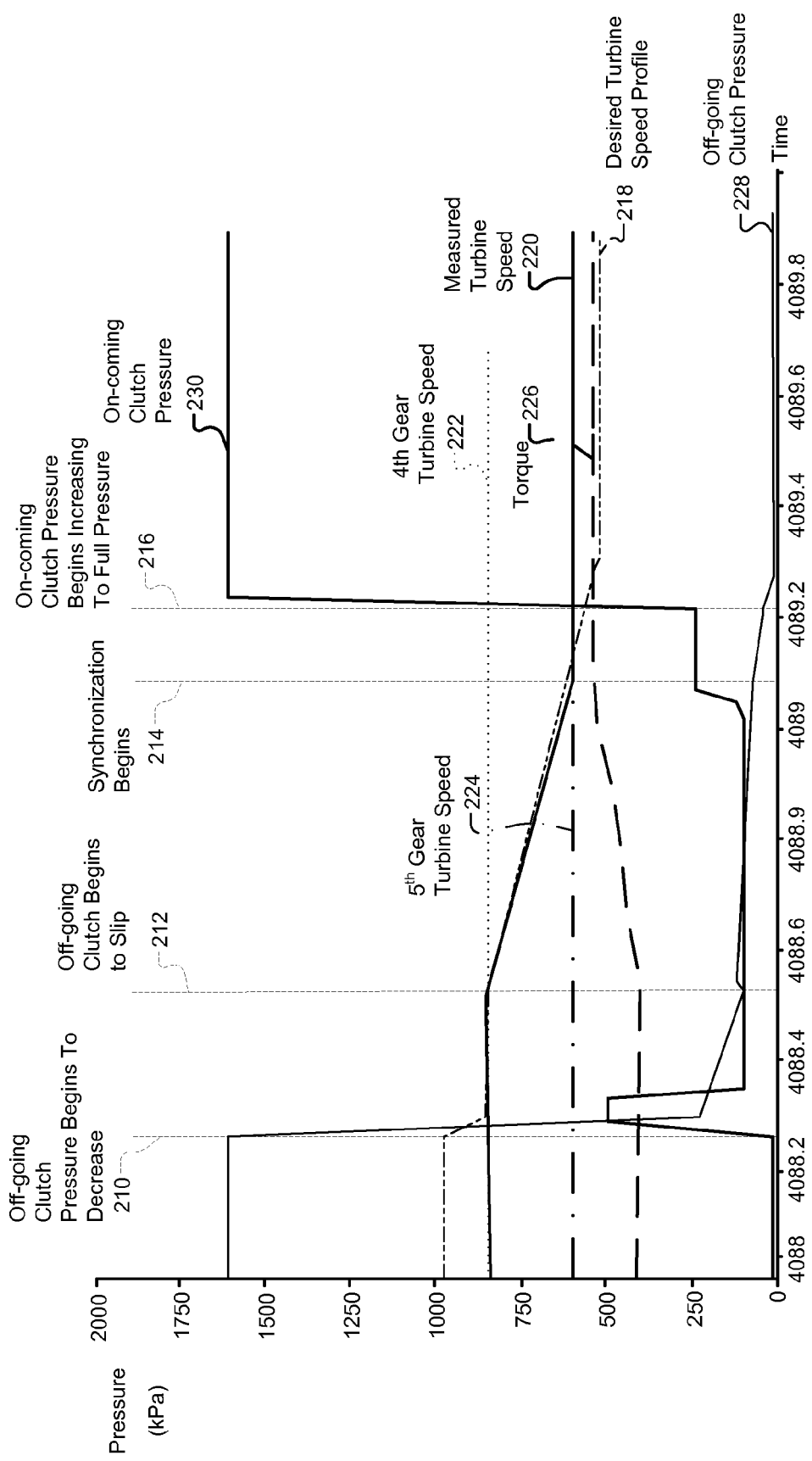
FIG. 3 is a chart depicting graphs of exemplary transmission signals during an up-shift of a transmission using an off-going clutch control according to the principles of the present disclosure.

With reference to FIG. 3, a chart is shown depicting an exemplary turbine speed profile during an up-shift of a transmission using an off-going clutch control. Exemplary trace 226 represents a negative engine torque. Exemplary trace 222 represents a fourth gear turbine speed and exemplary trace 224 represents a fifth gear turbine speed. Exemplary trace 220 represents a measured turbine speed. Exemplary trace 218 represents a desired turbine speed profile.

At time 210, control initiates an up-shift from a fourth gear ratio to a fifth gear ratio. To complete the up-shift, a pressure of an off-going clutch, represented by exemplary trace 228, is decreased until slip is detected. For example only, the pressure of the off-going clutch may decrease at a predetermined rate. The slip of the off-going clutch may be detected when the measured turbine speed falls below a threshold turbine speed value, for example. A pressure of an oncoming clutch, represented by exemplary trace 230, begins to increase. At time 212, when off-going clutch slip is detected, the pressure of the off-going clutch 228 may be held constant for a predetermined time (not shown).

Thereafter, the pressure of the off-going clutch 228 may be controlled to minimize the difference between the measured turbine speed 220 and the desired turbine speed profile 218. Controlling the pressure of the off-going clutch 228 may include increasing and decreasing the pressure of the off-going clutch 228. The turbine may synchronize with a fifth gear when the measured turbine speed 220 matches the speed 224 corresponding to fifth gear.

As synchronization approaches, the pressure of the oncoming clutch 230 is commanded to a pressure that will fill the oncoming clutch. For example, the oncoming clutch may be filled when the difference between the measured turbine speed 220 and the fifth gear turbine speed 224 is less than a predetermined amount. Thereafter, the pressure of the off-going clutch is ramped to exhaust at a calibration ramp rate. At time 216, the pressure of the oncoming clutch pressure 230 is commanded to full pressure. For example only, the pressure of the oncoming clutch may increase from 250 kPa to 1625 kPa. Increasing the pressure of the oncoming clutch 230 fully engages the fifth gear.

Figure 4:
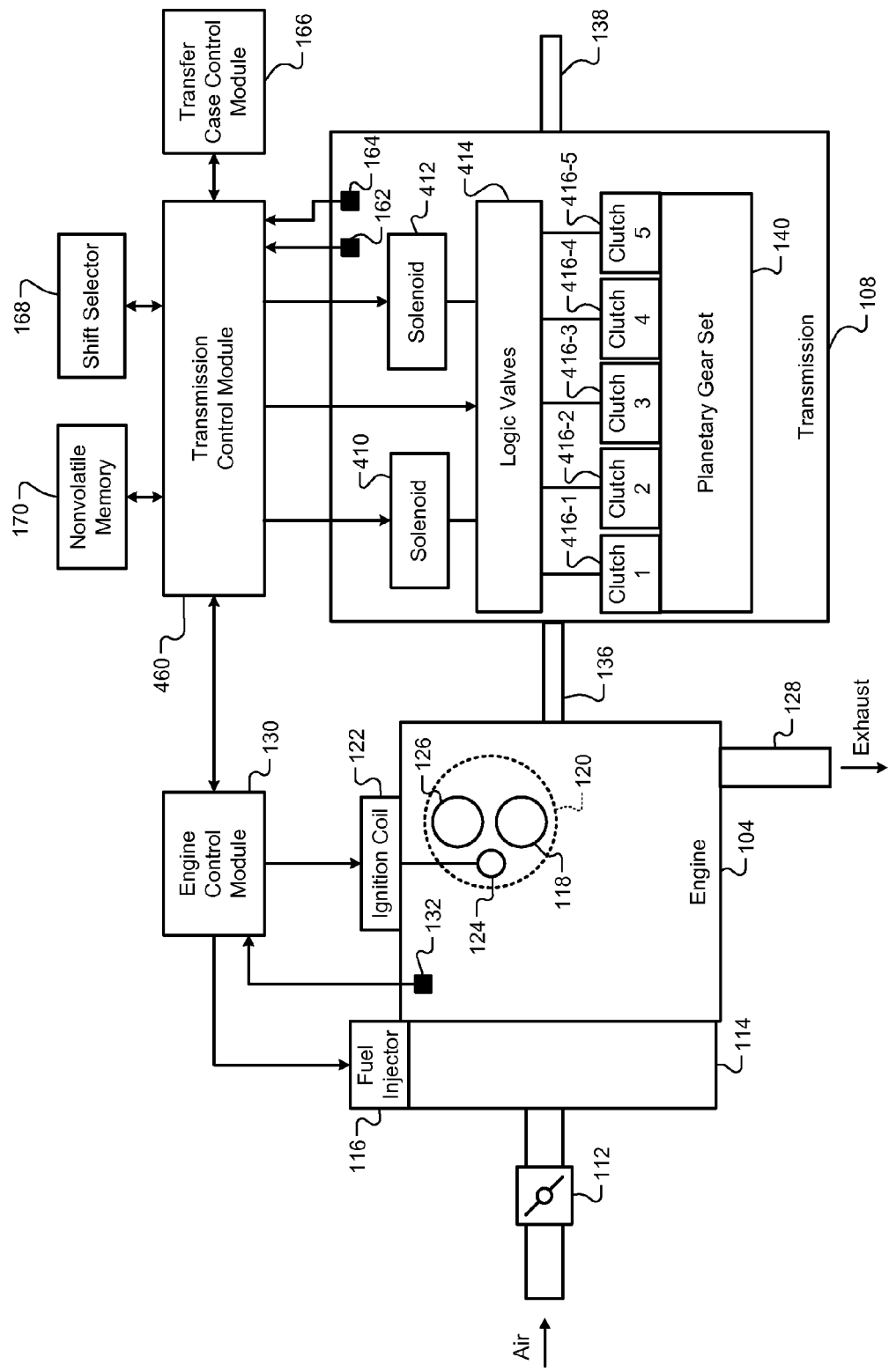
FIG. 4 is a functional block diagram of an exemplary vehicle powertrain according to the principles of the present disclosure.

With reference to FIG. 4, a functional block diagram of an exemplary powertrain is shown. The transmission 108 may include a first solenoid 410, a second solenoid 412, logic valves 414, and a planetary gear set 140. The transmission 108 may also include a set of clutches 416-1, 416-2, 416-3, 416-4, and 416-5 (collectively referred to as the clutches 416). Each one of the clutches 416 may correspond to a different gear ratio. For example, clutch 416-1 may correspond to a first gear ratio and clutch 416-2 may correspond to a second gear ratio. The clutches 416 may number more or less than 5 depending on the number of gears in the planetary gear set 140.

The logic valves 414 may be configured to route hydraulic pressure from one of each of the first and second solenoids 410 and 412 to an off-going one and an oncoming one of the clutches 416. For example only, when preparing for a 4-5 shift, the logic valves 414 may be configured to route hydraulic pressure from the first solenoid 410 to the clutch 416-1 and from the second solenoid 412 to the clutch 416-2. The clutch 416-1 may correspond to a fourth gear and may be off-going, while the clutch 416-2 may correspond to a fifth gear and may be oncoming. When the fifth gear is fully engaged, the up-shift is complete and the transmission control module 460 may control the logic valves 414 to a new configuration in preparation for the next shift.

Figure 5A:
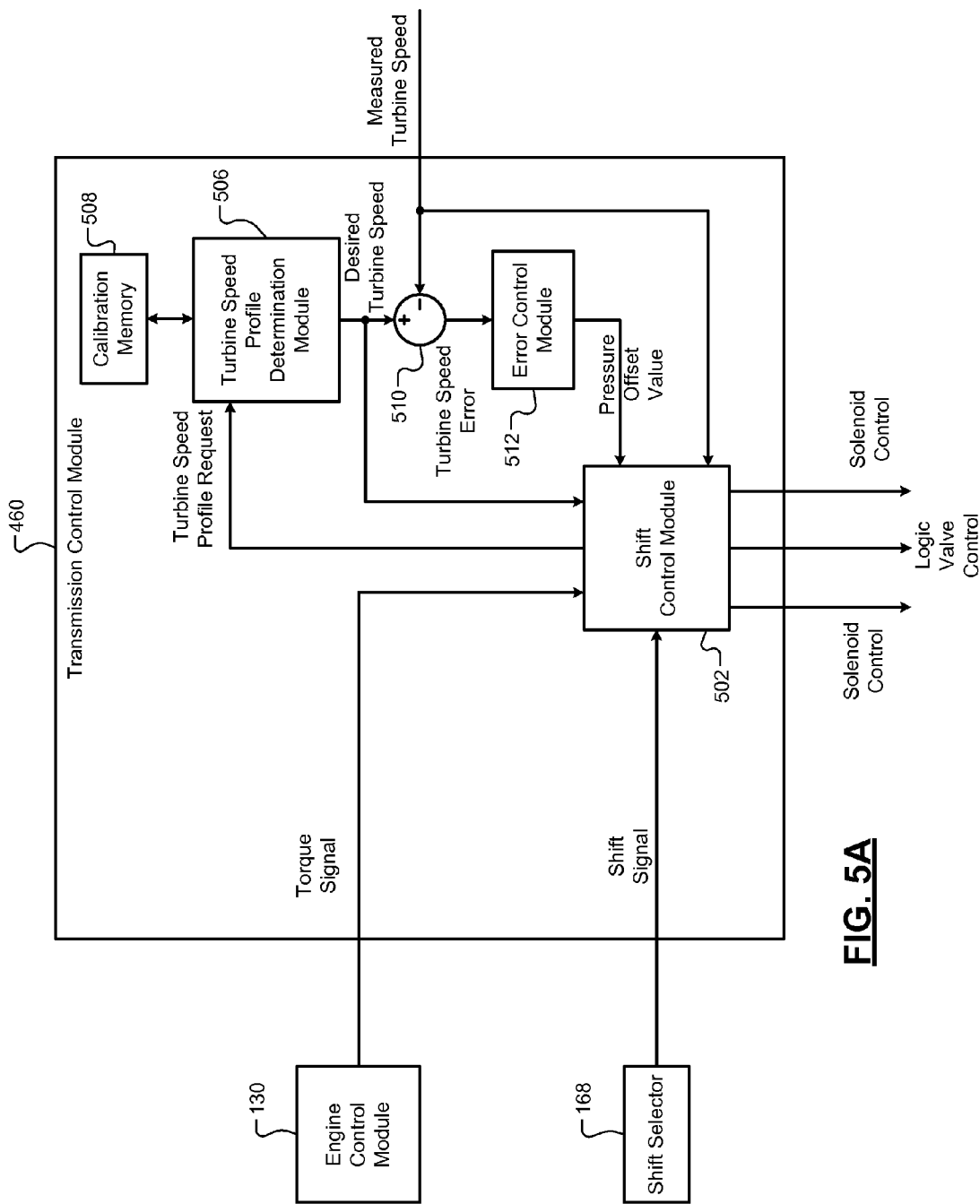
FIG. 5A is a functional block diagram of an exemplary transmission control module according to the principles of the present disclosure.

Referring now to FIG. 5A, a functional block diagram of an exemplary implementation of the transmission control module 460 is presented. The transmission control module 460 includes a shift control module 502 that receives shift requests from the shift selector 168. When the shift control module 502 detects that an up-shift has been requested, the shift control module 502 evaluates a torque signal from the engine control module 130. The torque information may include an estimate of current engine torque. If this torque is negative, the shift control module 502 may initiate a predetermined procedure for up-shifting when negative torque is being produced.

An off-going clutch may be controlled by a first solenoid 410, which the shift control module 502 controls using a first solenoid control signal. An oncoming clutch may be controlled by a second solenoid 412, which the shift control module 502 controls using a second solenoid control signal. For example only, the off-going clutch may correspond to a fourth gear, while the oncoming clutch may correspond to a fifth gear. The predetermined procedure may begin with the shift control module 502 commanding the off-going clutch to a first predetermined pressure.

At the first predetermined pressure, the off-going clutch should not yet be slipping. The shift control module 502 may command the first solenoid 410 to ramp the pressure of the off-going clutch downward at a predetermined rate until the off-going clutch begins to slip. This slip may be detected by the shift control module 502 as a decrease in turbine speed below a threshold turbine speed value. The shift control module 502 may command the first solenoid 410 to hold the pressure of the off-going clutch for a predetermined time when slip is detected.

The shift control module 502 may then instruct a turbine speed profile determination module 506 to output a desired turbine speed profile. For example only, the desired turbine speed profile may be stored in a calibration memory 508. The turbine speed profile determination module 506 outputs the desired turbine speed to a summing module 510 and the shift control module 502. The shift control module 502 may convert the desired turbine speed into a commanded off-going clutch pressure. The summing module 510 receives the desired turbine speed and the measured turbine speed and generates a turbine speed error signal based on a difference between the two speeds.

An error control module 512 receives the turbine speed error signal from the summing module 510 and may correct the turbine speed error using a proportional-integral function. The error control module 512 receives the corrected turbine speed error and may convert the corrected turbine speed error to a pressure offset value. The shift control module 502 receives the pressure offset value and may add it to the commanded off-going clutch pressure. The pressure offset value minimizes the difference between the measured turbine speed and the desired turbine speed profile.

Once the measured turbine speed reaches a speed that corresponds to the next gear ratio, synchronization is reached. When synchronization is reached, the oncoming clutch is commanded to a pressure that will fill the oncoming clutch. Once the oncoming clutch is full, the second solenoid 412 is commanded to provide full pressure to the hydraulic fluid in the oncoming clutch. The off-going clutch pressure may be ramped down to exhaust the remaining hydraulic fluid.

Figure 5B:
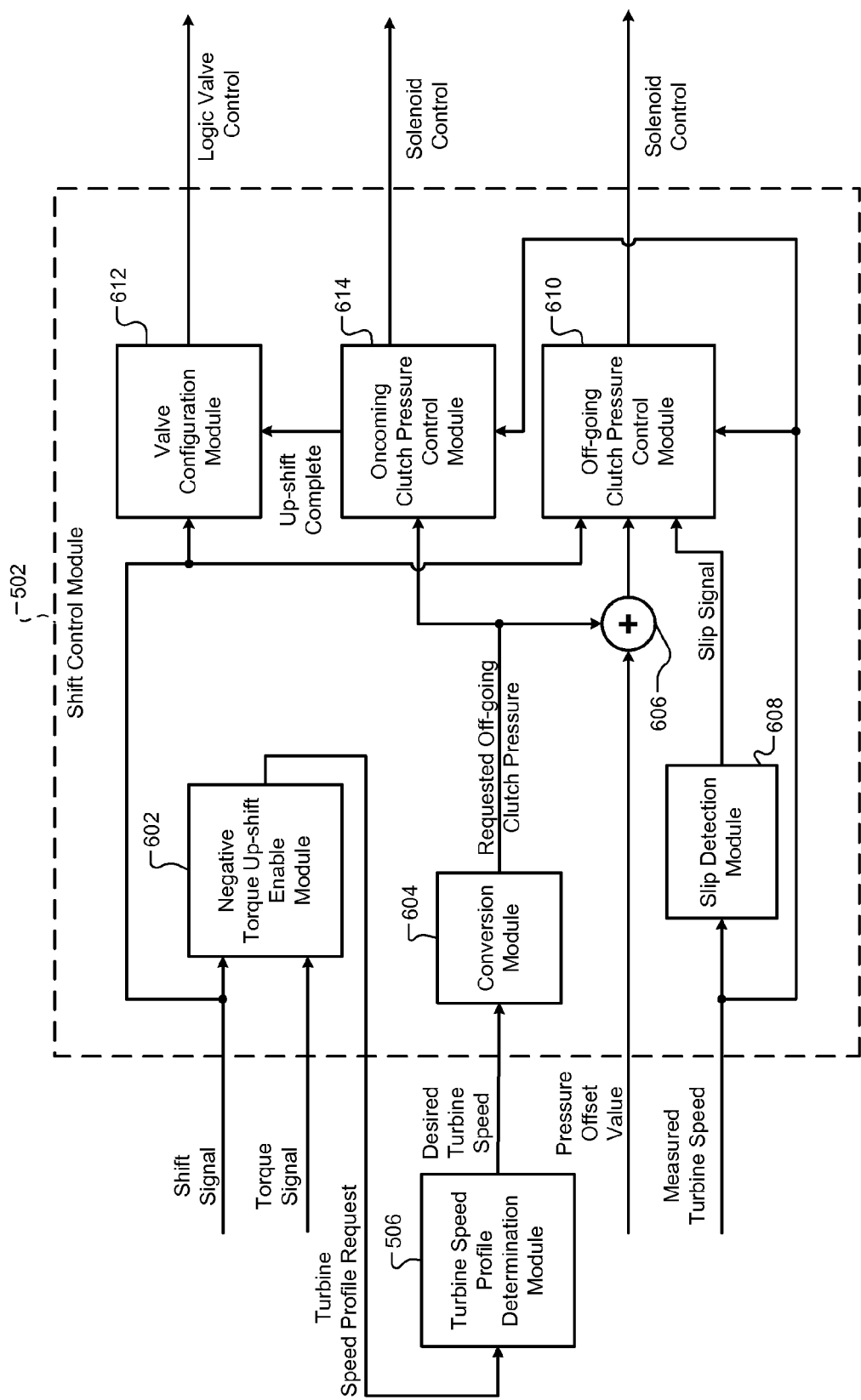
FIG. 5B is a functional block diagram of an exemplary shift control module according to the principles of the present disclosure.

Referring now to FIG. 5B, a functional block diagram of an exemplary implementation of the shift control module 502 is presented. A negative torque up-shift enable module 602 may receive a shift signal and a torque signal. The negative torque up-shift enable module 602 may determine if an up-shift is desired when the shift signal corresponds to a predetermined up-shift value, for example only. The negative torque up-shift enable module 602 may also determine if the torque signal is less than or equal to zero. If the shift signal corresponds to the predetermined up-shift value and the torque signal is less than or equal to zero, the negative torque up-shift enable module 602 generates a turbine speed profile request. The turbine speed profile determination module 506 generates a desired turbine speed profile based on the turbine speed profile request. A conversion module 604 may convert the desired turbine speed to a commanded off-going clutch pressure.

When a shift signal is generated, an off-going clutch pressure control module 610 may decrease the off-going clutch pressure to a first predetermined pressure. At the first predetermined pressure, the off-going clutch should not yet be slipping. The off-going clutch pressure would then ramp downward at a predetermined rate. As the off-going clutch pressure decreases, the off-going clutch will begin to slip. This slip may be detected by a slip detection module 608, for example only. The slip detection module 608 may detect slip based on a decrease in turbine speed and generate a slip signal when slip is detected. When the off-going clutch pressure control module 610 receives the slip signal, control of the off-going clutch pressure based on the desired turbine speed profile begins.

When the off-going clutch pressure control module 610 begins to control the pressure of the off-going clutch, a summing module 606 may sum the pressure offset value and the commanded off-going clutch pressure. The pressure offset value minimizes the difference between the measured turbine speed and the desired turbine speed profile. The turbine may synchronize with a fifth gear when the measured turbine speed 220 matches the speed 224 corresponding to fifth gear. When synchronization is reached, the oncoming clutch is commanded to a pressure that will fill the oncoming clutch. Once the oncoming clutch is full, the second solenoid 412 is commanded to provide full pressure to the oncoming clutch and the pressure on the off-going clutch may be ramped down to exhaust the remaining hydraulic fluid. Once the new gear is engaged, the oncoming clutch pressure control module 614 may generate a signal indicating that the shift has been completed. Next, a valve configuration module 612 may control the logic valves 414 to a new configuration when the signal is received.

Figure 6:
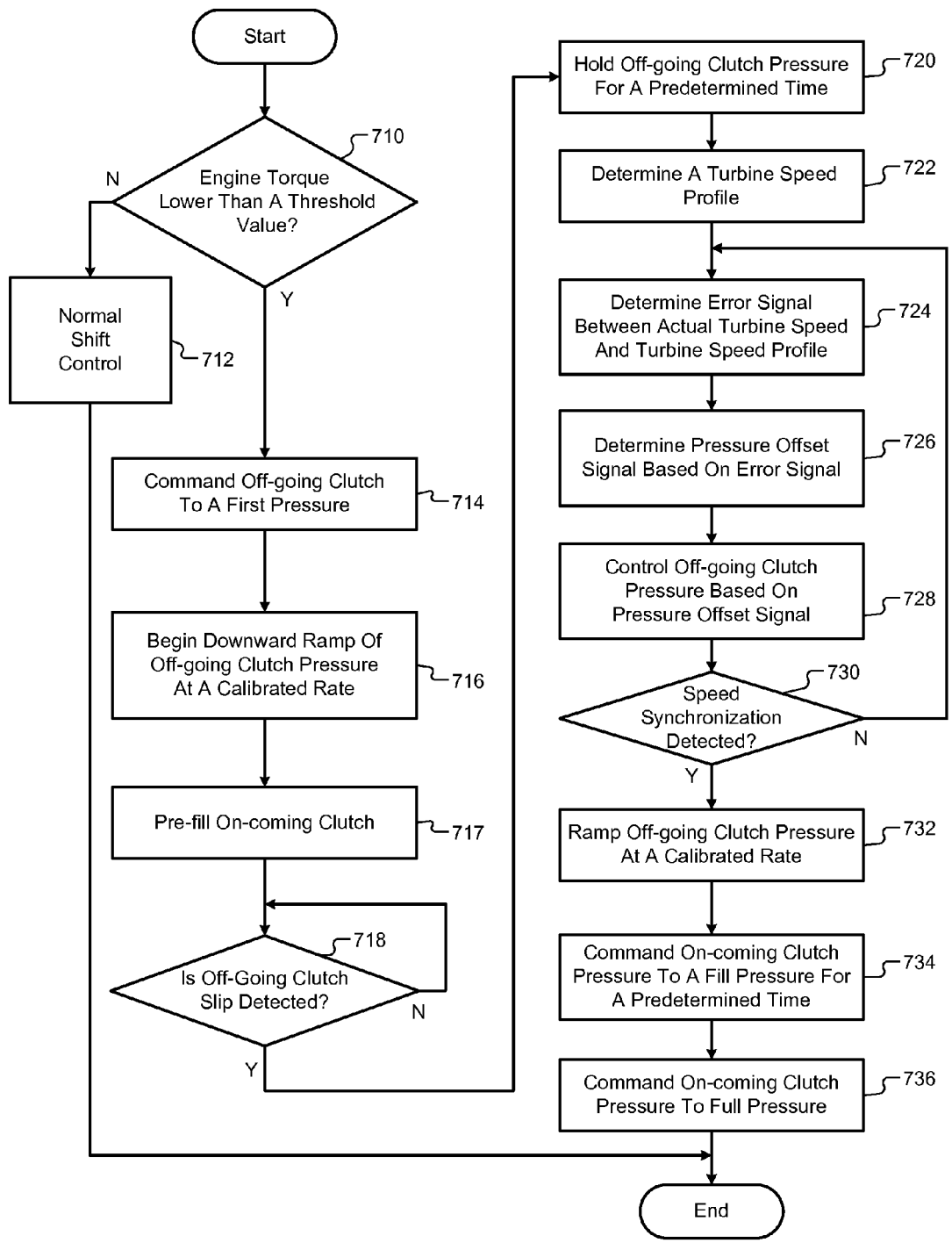
FIG. 6 is a flow diagram depicting exemplary steps of an up-shift control in a transmission control module according to the principles of the present disclosure.

Referring now to FIG. 6, a flowchart depicts exemplary operation of the transmission control module 460 when an up-shift is desired. In step 710, control determines whether the torque 226 is below a threshold value. If so, control continues in step 714. If the torque 226 is not below a threshold value, control continues in step 712. In step 714, an off-going clutch is commanded to a first pressure.

In step 716, the off-going clutch pressure 228 is ramped down at a calibrated rate. In step 717, the oncoming clutch is pre-filled. In step 718, control determines whether the off-going clutch is slipping. If so, control continues in step 720. If control determines that the off-going clutch is not slipping, control remains in step 718. In step 720, the off-going pressure 228 is held constant for a predetermined time. In step 722, a desired turbine speed profile 218 is generated. In step 724, a closed-loop speed error is determined based on a difference between the desired turbine speed profile 218 and the turbine speed 220.

In step 726, control determines a pressure offset value of the off-going clutch pressure based on the closed-loop speed error signal and a calibrated closed-loop gain. In step 728, the off-going clutch pressure is increased/decreased based on the pressure offset value. In step 730, control determines whether gear synchronization is detected. If the gear synchronization is not detected, control remains in step 724. If the gear synchronization is detected, control continues in step 730.

In step 732, the off-going clutch pressure 228 is decreased at a calibrated rate. In step 734, oncoming clutch pressure is commanded to a fill pressure for a predetermined time. In step 736, the oncoming clutch pressure 230 is increased to full pressure and control ends.

Those skilled in the art can now appreciate from the foregoing description that the broad teachings of the disclosure may be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A transmission control module having a processor, the transmission control module comprising:
    a shift control module that generates an enable signal in response to an up-shift being requested and engine torque being below a threshold torque value, wherein generating the enable signal is suspended in response to the engine torque being above the threshold torque value; and
    a turbine speed profile determination module that selectively generates a desired turbine speed profile,
    wherein, in response to the enable signal being generated, the shift control module controls a clutch pressure of an off-going clutch based on a measured turbine speed and the desired turbine speed profile.

2. The transmission control module of claim 1 wherein the shift control module minimizes a difference between the measured turbine speed and the desired turbine speed profile in response to slip of the off-going clutch being detected.

3. The transmission control module of claim 2 wherein the shift control module decreases the clutch pressure at a predetermined rate until slip of the off-going clutch is detected.

4. The transmission control module of claim 2 wherein the shift control module detects slip of the off-going clutch based on a decrease in the measured turbine speed.

5. The transmission control module of claim 3 wherein the shift control module holds the clutch pressure for a predetermined period after detecting slip of the off-going clutch and before control based on the desired turbine speed profile begins.

6. The transmission control module of claim 1 further comprising an error control module that determines an offset value based on a difference between the desired turbine speed profile and the measured turbine speed, wherein the shift control module adjusts the clutch pressure based on the offset value.

7. The transmission control module of claim 6 wherein the offset value is a pressure value and the shift control module controls the clutch pressure based on a sum of the offset value and an open-loop pressure value.

8. The transmission control module of claim 1 wherein the requested up-shift is from a first gear to a second gear and wherein the shift control module decreases the clutch pressure at a predetermined rate in response to the measured turbine speed reaching a synchronization speed corresponding to the second gear.

9. The transmission control module of claim 1 wherein the threshold torque value is less than or equal to zero.

10. The transmission control module of claim 1 wherein the shift control module generates a control signal for a first solenoid to control the clutch pressure.

11. A method for controlling an up-shift in an automatic transmission, the method comprising:
    generating, using a processor, an enable signal in response to an up-shift being requested and engine torque being below a threshold torque value, wherein generation of the enable signal is suspended in response to the engine torque being above the threshold torque value;
    selectively generating a desired turbine speed profile; and
    in response to the enable signal being generated, controlling a clutch pressure of an off-going clutch based on a measured turbine speed and the desired turbine speed profile.

12. The method of claim 11 further comprising, in response to detecting slip of the off-going clutch, minimizing a difference between the measured turbine speed and the desired turbine speed profile.

13. The method of claim 12 further comprising decreasing the clutch pressure at a predetermined rate until slip of the off-going clutch is detected.

14. The method of claim 12 further comprising detecting slip of the off-going clutch based on a decrease in the measured turbine speed.

15. The method of claim 13 further comprising holding the clutch pressure for a predetermined period after detecting slip of the off-going clutch and before control based on the desired turbine speed profile begins.

16. The method of claim 11 further comprising:
    determining an offset value based on a difference between the desired turbine speed profile and the measured turbine speed; and
    adjusting the clutch pressure based on the offset value.

17. The method of claim 16 further comprising controlling the clutch pressure based on a sum of the offset value and an open-loop pressure value, wherein the offset value is a pressure value.

18. The method of claim 11 wherein the requested up-shift is from a first gear to a second gear, the method further comprising decreasing the clutch pressure at a predetermined rate in response to the measured turbine speed reaching a synchronization speed corresponding to the second gear.

19. The method of claim 11 wherein the threshold torque value is less than or equal to zero.

20. The method of claim 11 further comprising generating a control signal for a first solenoid to control the clutch pressure.

* * * * *